June 10, 1941
L. BURNS
Re. 21,823
ELECTRIC DISCHARGE LAMP
Original Filed Dec. 20, 1934
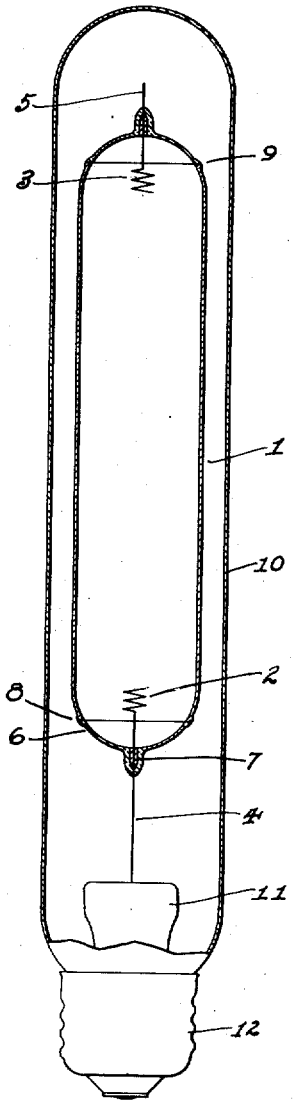
Laurence Burns
INVENTOR
BY John J. Rogan
ATTORNEY Reissued June 10, 1941

Re. 21,823

UNITED STATES PATENT OFFICE 21,823

ELECTRIC DISCHARGE LAMP

Laurence Burns, Swampscott, Mass., assignor to Hygrade Sylvania Corporation, Salem, Mass., a corporation of Massachusetts Original No. 2,061,892, dated November 24, 1936, Serial No. 758,406, December 20, 1934. Application for reissue November 23, 1938, Serial No. 242,048

4 Claims. (Cl. 176—122)

This invention relates to electric lamps and more particularly to the lamps of the gas or vapor discharge type.

An object of the invention is to improve the efficiency of discharge lamps of the vapor arc type, although certain features of the invention are advantageously applicable to other types of discharge lamps.

In a vapor arc discharge lamp, particularly where the vapor is at relatively high pressure when the lamp is in operation, the efficiency of the lamp is a function of the vapor pressure and the power input required to maintain such vapor pressure. It has been found that in a high pressure vapor arc lamp employing mercury as the vaporizable agent, a considerable part of the radiation from the arc is in the infra-red region. Since the rays in the infra-red region have negligible optical effect, ordinarily the passage of these rays through the enclosing envelope represents a corresponding loss in luminous efficiency. In accordance with the present invention it is proposed to so design the enclosing envelope that these otherwise useless infra-red radiations are utilized to conserve the heat of the arc, and thus not only reduce the interval required for "lighting up" and "cooling" of the lamp, but also serve to increase the efficiency of the lamp when in operation.

Accordingly one of the principal objects of this invention is to provide a mercury arc lamp with an enclosing envelope which substantially absorbs and conserves the infra-red radiations.

Another feature of the invention relates to a mercury vapor arc lamp wherein the enclosing envelope is designed to absorb and conserve a substantially large percent of the ultra-violet radiation.

A feature of the invention resides in the provision of a high pressure mercury vapor arc lamp having an envelope designed to have its maximum wave transmission in the band between the ultra-violet and infra-red ranges of wave length.

Another feature of the invention relates to a high pressure mercury vapor arc lamp with an enclosing envelope of boro-silicate glass having incorporated therein a small percent of ferrous oxide or similar metallic oxide to increase the heat conservation of the lamp.

Other features and advantages of the invention not specifically enumerated will be apparent after a consideration of the following detailed description and the appended claims.

While the invention will be disclosed herein as embodied in one particular lamp structure, it will be understood that this is done merely for purposes of explanation and not by way of limitation.

In the drawing, there is shown in partial section, a view of a lamp embodying features of the invention. The numeral 1 represents an inner enclosing envelope preferably of a hard glass, and having mounted at opposite ends thereof a pair of refractory electrodes 2, 3. These electrodes are provided with respective lead-in wires 4, 5, and interposed between the envelope and the lead-in wires are graded seals, each comprising a shallow cup-like cap member 6 of relatively soft glass into which is sealed the lead-in wire, the latter having thereon a suitable glass bead of boro-silicate or similar glass such for example as "Nonex" glass. Preferably, although not necessarily, the caps 6 are butt-sealed to the respective ends of the envelope proper as indicated by the numerals 8, 9. Preferably also, each electrode is so mounted that the major portion of its length is in advance of the associated seal and is also so positioned that during operation of the lamp there is sufficient heat in the electrode chamber including the cap to prevent condensation of mercury therein. While electrodes 2, 3, may be of any well-known structure they are preferably, although not necessarily, of tungsten wire doubly coiled as described in detail in application Serial No. 752,016, filed November 8, 1934.

The sealed envelope 1 is previously provided with the proper filling of mercury so that when the lamp is operating at its rated wattage, all the mercury is maintained in vapor form and at relatively high pressure, for example in the range between 100 mms. and 3000 mms. of mercury. The envelope 1 is supported in any suitable manner within another evacuated envelope 10 which is provided with a re-entrant press 11 through which pass the conductors connecting to the lead wires 4 and 5. The envelope 1 may be provided with an ordinary Mogul type base 12 so that the lamp may be used in conventional lamp sockets. For a further detailed description of the structure of lamp shown in the drawing, reference may be had to application Serial No. 758,405, filed December 20, 1934.

In accordance with the present invention either the inner envelope 1 or the outer envelope 10 or both have their main body portions of a specially chosen glass which is capable of absorbing to a marked extent radiations in the infra-red and ultra-violet wave length ranges. Thus the envelope 1 may be of an ordinary borosilicate glass such as "Pyrex" to which a small percent of ferrous oxide has been added for the purpose of markedly increasing the absorption of the said rays. Instead of employing ferrous oxide for this purpose any oxide or oxides of the metals beryllium, magnesium, calcium, zinc, strontium, cadmium, barium may be employed so long as the percentage of these elements is relatively small and does not materially affect the transmission characteristics of the glass in the desired range of wave lengths. For example it has been found that in the type of lamp disclosed the green and yellow spectral lines at about 546 and 579 millimicrons wave length are the ones that chiefly affect the eye in producing luminosity. It has also been found that the incorporation of the small percentage of oxides above mentioned in the glass envelope increases the absorption of the infra-red and blue and ultra-violet rays to a very marked extent without correspondingly reducing the transmission characteristics of the envelope for the desired range of wave lengths namely those in the green and yellow parts of the spectrum. It has also been found that by incorporating a relatively small percentage of tin in the glass that the desired characteristics are improved.

When the outer envelope 10 has incorporated therein materials as above set forth, this outer envelope absorbs the infra-red, blue and ultraviolet radiations not only from the arc itself but also the corresponding radiations from the envelope 1 which during operation is at a relatively high temperature. Accordingly if desired, the envelope 1 may be made of any hard glass such as "Pyrex" or combustion tubing as set forth in application Serial No. 758,405, filed December 20, 1934, and the outer envelope 10 may alone be designed to achieve the desired conservation of the heating radiations. On the other hand the envelope 10 may be made of ordinary lead glass while the envelope 1 may be designed to achieve the desired conservation of heat as above set forth. Instead of incorporating the materials in the body of the glass envelope to achieve the selective absorption and transmission characteristic, a similar result may be obtained by providing these envelopes with suitable coatings of sufficient thinness to transmit the desired radiations chiefly in the yellow and green ranges while materially absorbing and conserving the radiations in all other ranges. As examples of such coatings may be mentioned the following: boron oxide with a small percent of ferrous oxide, or boron silicate with a small percent of ferrous oxide.

Various changes and modifications may be made herein without departing from the spirit and scope of the invention.

What I claim is:

1. A vapor discharge lamp comprising a pair of spaced electrodes immersed in a vapor adapted to sustain an arc-like discharge therebetween, having the greatest visual effect in the green and yellow radiations, and means for conserving the heat of the arc including an enclosing envelope of borosilicate glass having incorporated therein a small percentage of ferrous oxide and tin to increase the absorption of the infra-red and ultraviolet radiations while allowing the yellow and green radiations to pass.

2. A lamp of the type described comprising an inner envelope containing a mercury vapor filling, a pair of spaced electrodes mounted within said envelope, an outer envelope enclosing the first envelope, one of said envelopes having incorporated therein a small percentage of ferrous oxide and tin to increase the absorption of infra-red and ultraviolet radiations without correspondingly affecting the yellow and green radiations.

3. A vapor discharge lamp comprising a pair of spaced electrodes immersed in a vapor adapted to sustain an arc-like discharge therebetween, having the greatest visual effect in the green and yellow radiations, and means for conserving the heat of the arc including an enclosing envelope of borosilicate glass having incorporated therein a small percentage of tin and one at least of the following oxides: iron, zinc, beryllium, to increase the absorption of the infra-red and ultra-violet radiations while allowing the yellow and green radiations to pass.

4. A vapor discharge lamp comprising a pair of spaced electrodes immersed in a vapor adapted to sustain an arc-like discharge therebetween, having the greatest visual effect in the green and yellow radiations, and an outer envelope enclosing an inner silicate envelope having incorporated therein a small percentage of tin and at least one of the following oxides: iron, zinc, beryllium, to increase the absorption of at least the ultraviolet radiation while allowing the yellow and green radiations to pass.

LAURENCE BURNS.